(12) United States Patent
Giachi et al.

(10) Patent No.: US 11,965,527 B2
(45) Date of Patent: Apr. 23, 2024

(54) STATOR BLADE FOR A CENTRIFUGAL COMPRESSOR

(71) Applicant: NUOVO PIGNONE TECNOLOGIE—S.R.L., Florence (IT)

(72) Inventors: Marco Giachi, Florence (IT); Filippo Rubechini, Florence (IT); Andrea Arnone, Florence (IT)

(73) Assignee: Nuovo Pignone Technologie SRL, Florence (IT)

( * ) Notice: Subject to any disclaimer, the term of this patent is extended or adjusted under 35 U.S.C. 154(b) by 92 days.

(21) Appl. No.: 17/594,982

(22) PCT Filed: May 7, 2020

(86) PCT No.: PCT/EP2020/025211
§ 371 (c)(1),
(2) Date: Nov. 4, 2021

(87) PCT Pub. No.: WO2020/224807
PCT Pub. Date: Nov. 12, 2020

(65) Prior Publication Data
US 2022/0299044 A1    Sep. 22, 2022

(30) Foreign Application Priority Data
May 9, 2019    (IT) .................... 102019000006674

(51) Int. Cl.
*F04D 29/44*    (2006.01)
*F01D 5/14*    (2006.01)
(Continued)

(52) U.S. Cl.
CPC ........... *F04D 29/444* (2013.01); *F01D 5/145* (2013.01); *F01D 9/041* (2013.01); *F02C 6/12* (2013.01);
(Continued)

(58) Field of Classification Search
CPC ........ F04D 29/444; F04D 17/12; F01D 5/145; F01D 9/041; F05D 2240/121;
(Continued)

(56) References Cited

U.S. PATENT DOCUMENTS

| | | | | |
|---|---|---|---|---|
| 2,967,013 A | * | 1/1961 | Dallenbach | ........... F04D 29/444 415/181 |
| 4,349,314 A | * | 9/1982 | Erwin | ..................... F04D 21/00 415/181 |

(Continued)

FOREIGN PATENT DOCUMENTS

| | | |
|---|---|---|
| CN | 1111727 A | 11/1995 |
| EP | 0648939 A2 | 4/1995 |

(Continued)

OTHER PUBLICATIONS

Machine Translation of JP2013124624 (Year: 2013).*

*Primary Examiner* — Brian Christopher Delrue
(74) *Attorney, Agent, or Firm* — Paul Frank + Collins P.C.

(57) ABSTRACT

A stator blade for a centrifugal compressor having a front portion configured to generate one or more strear-wise vortices in the gas flow around the stator blade in order to avoid and/or delay a detachment of the gas flow from the suction surface of the stator blade especially when the centrifugal compressor is not operating at its operational design speed.

12 Claims, 9 Drawing Sheets

(51) Int. Cl.
   *F01D 9/04*         (2006.01)
   *F02C 6/12*         (2006.01)
   *F04D 17/12*      (2006.01)

(52) U.S. Cl.
   CPC ........ *F04D 17/12* (2013.01); *F05D 2240/121* (2013.01); *F05D 2240/127* (2013.01); *F05D 2250/183* (2013.01); *F05D 2270/17* (2013.01)

(58) Field of Classification Search
   CPC ......... F05D 2240/127; F05D 2250/183; F05D 2270/17; F05D 2250/182
   See application file for complete search history.

(56) References Cited

U.S. PATENT DOCUMENTS

| | | | |
|---|---|---|---|
| 6,318,677 | B1 | 11/2001 | Dixon |
| 9,581,034 | B2 * | 2/2017 | Kushner ................ F01D 9/041 |
| 10,358,931 | B2 * | 7/2019 | Paruchuri ............. F04D 29/544 |
| 10,465,520 | B2 * | 11/2019 | Vandeputte ........ B23K 15/0086 |
| 11,035,380 | B2 * | 6/2021 | Saito ..................... F04D 29/444 |
| 11,255,345 | B2 * | 2/2022 | Kushner ................ F04D 29/661 |
| 2001/0033792 | A1 * | 10/2001 | Nagaoka ................... F04D 1/06 |
| | | | 415/208.3 |

FOREIGN PATENT DOCUMENTS

| | | | | |
|---|---|---|---|---|
| EP | 1873402 A1 * | 1/2008 | .......... | F04D 29/444 |
| EP | 1873402 A1 | 1/2008 | | |
| FR | 3065023 A1 * | 10/2018 | ............ | F01D 5/141 |
| GB | 2237071 A | 4/1991 | | |
| JP | 2012072735 A | 4/2012 | | |
| JP | 2013124624 A * | 6/2013 | .......... | F04D 29/444 |
| KR | 20180019416 A | 2/2018 | | |

\* cited by examiner

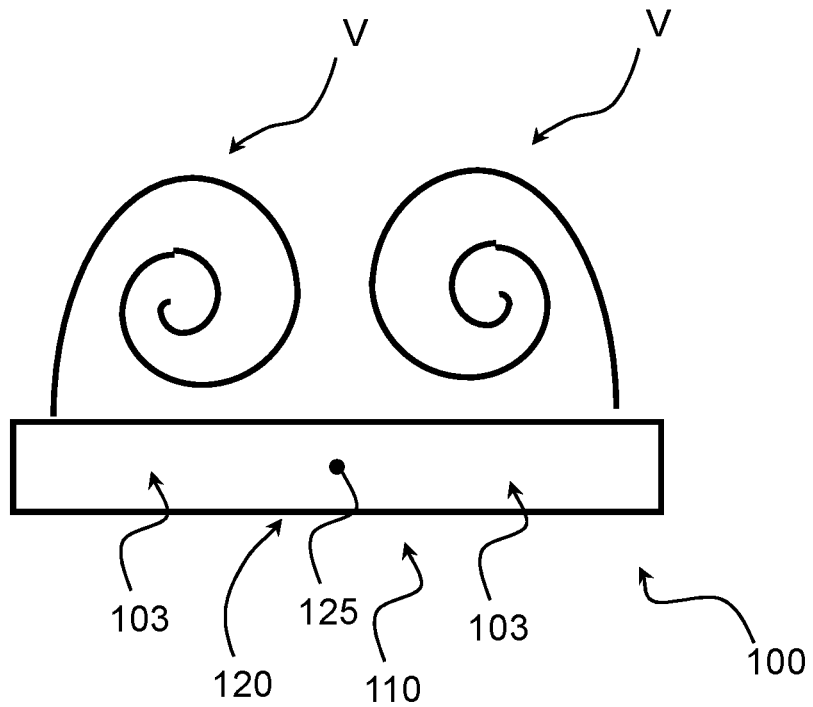
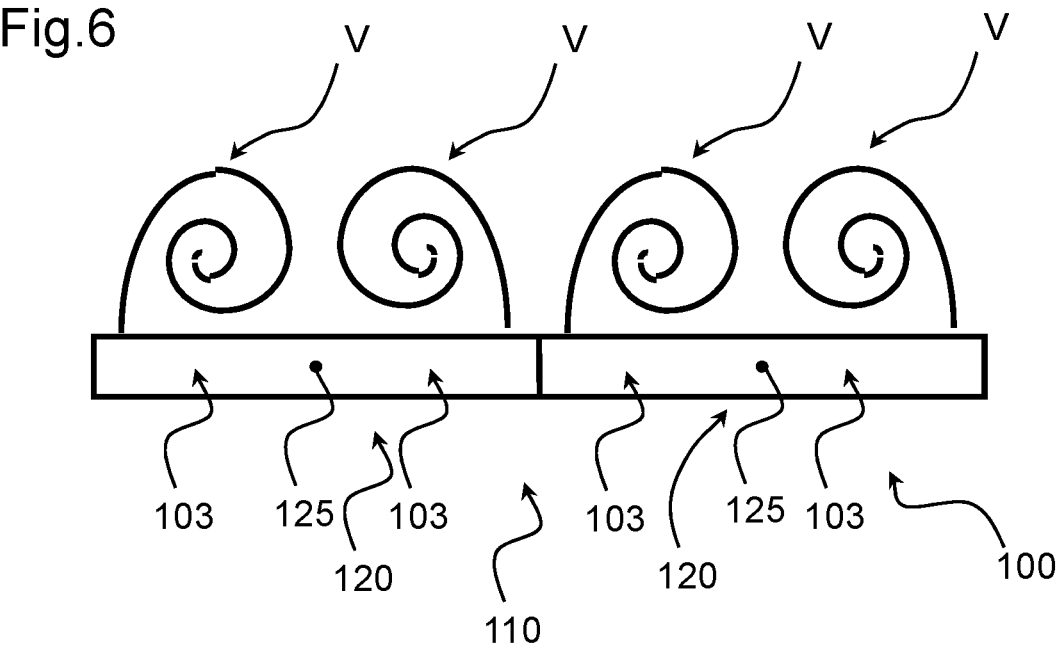

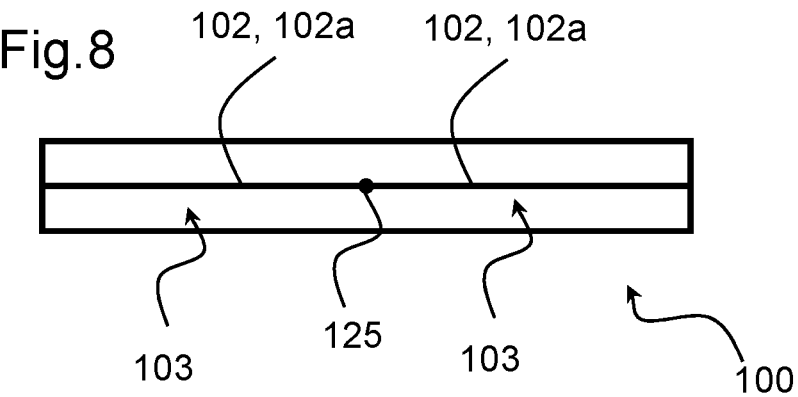
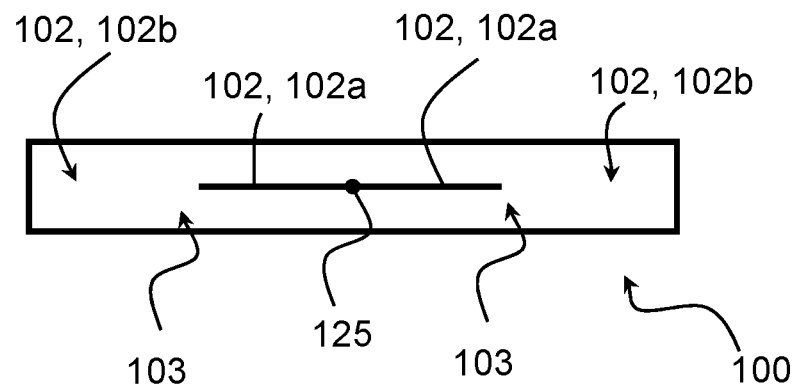
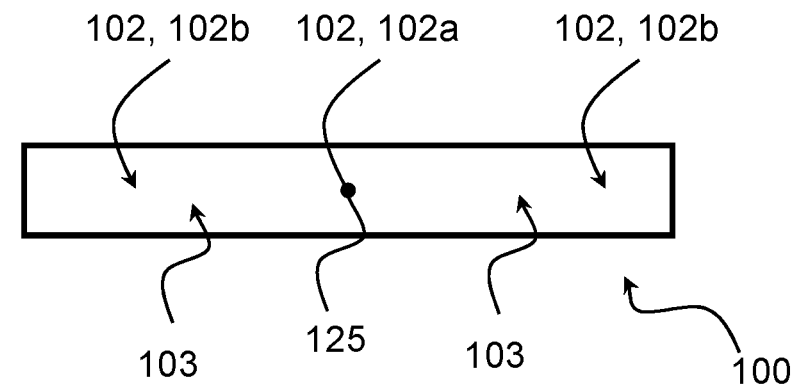

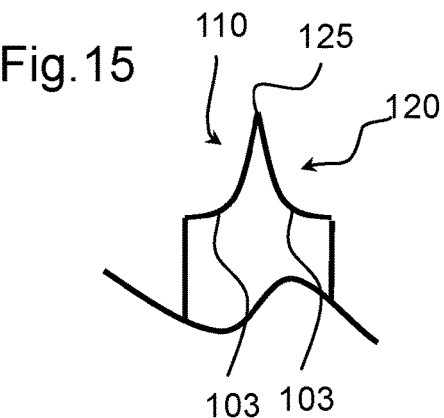
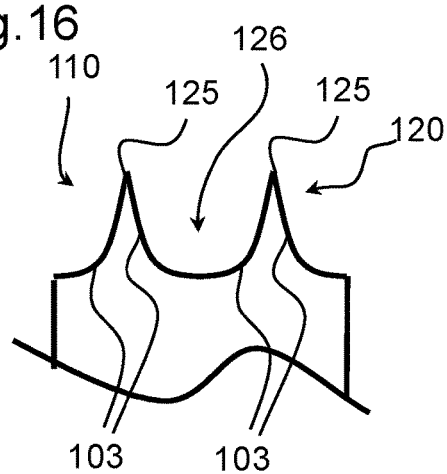
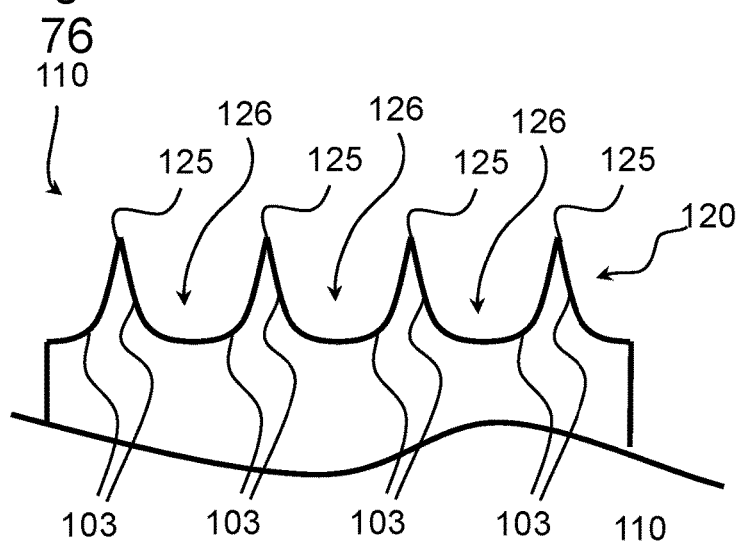
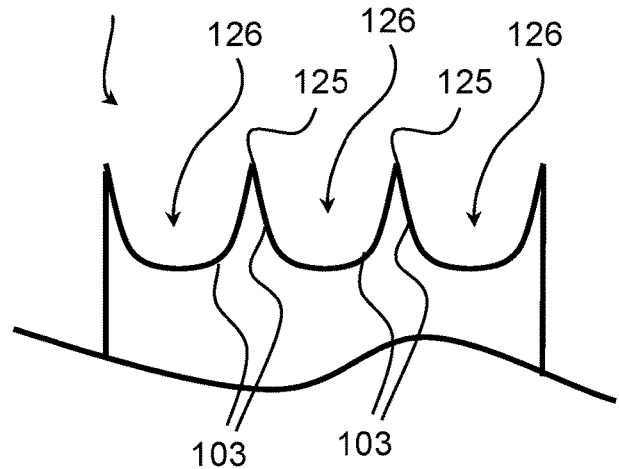

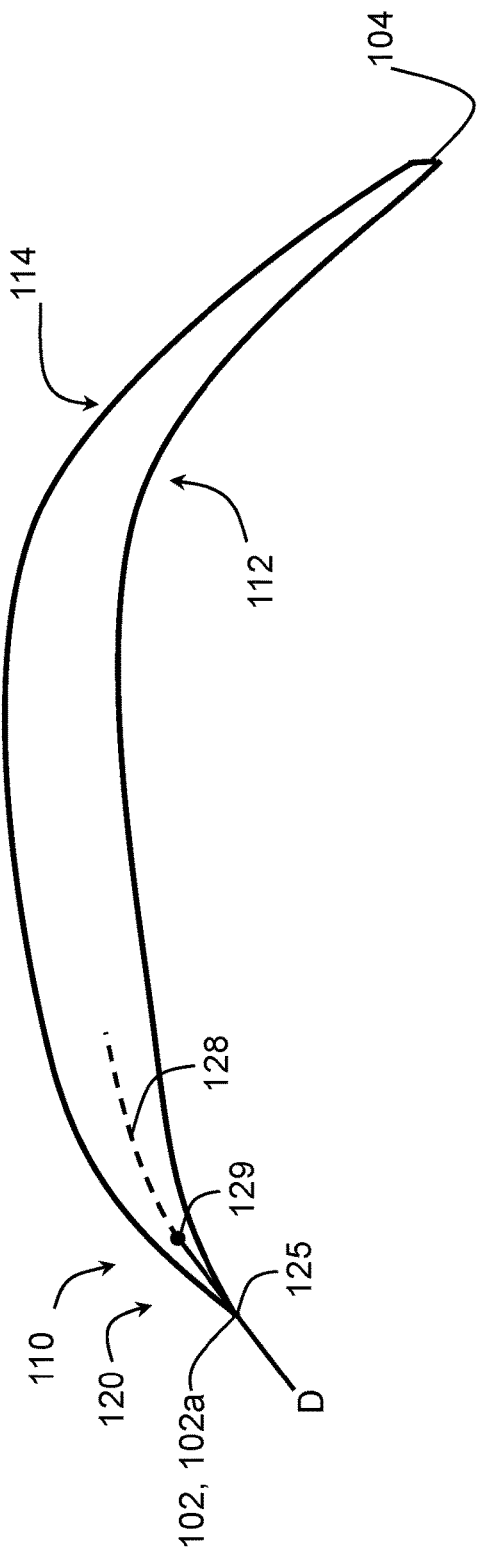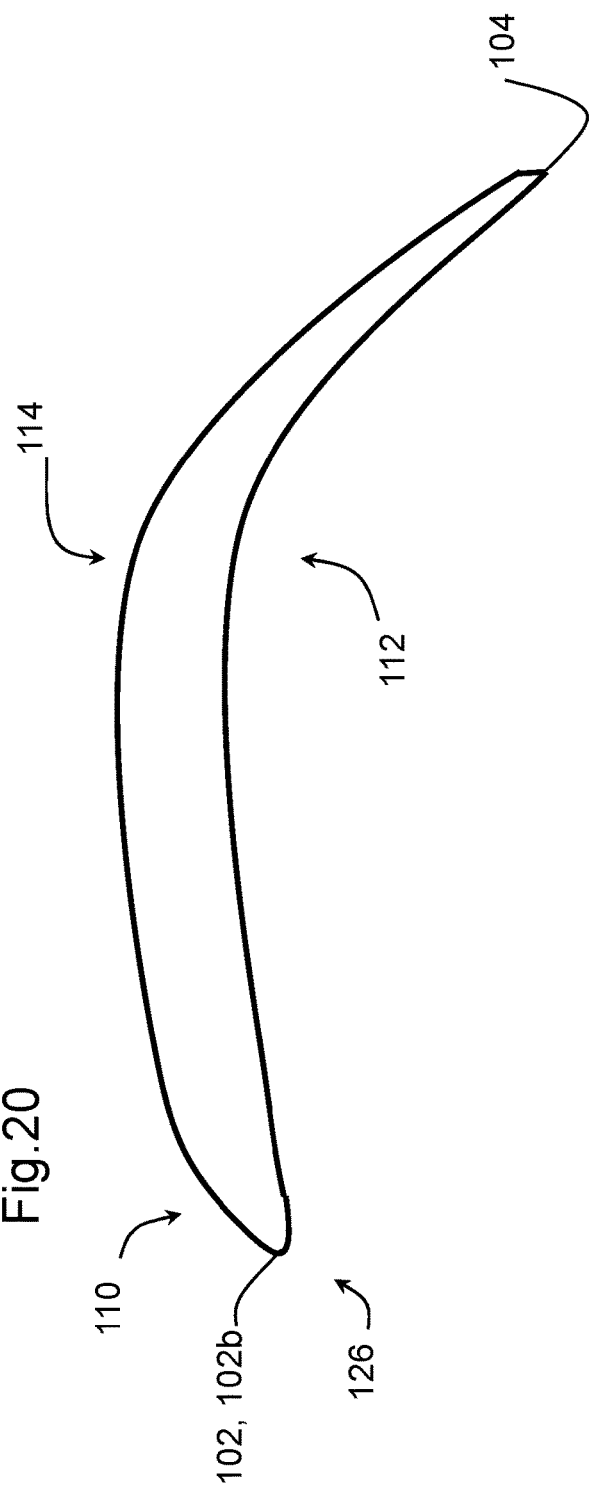

STATOR BLADE FOR A CENTRIFUGAL COMPRESSOR

TECHNICAL FIELD

The subject-matter disclosed herein relates to the field of centrifugal compressors for the oil & gas industry. In particular, the subject-matter disclosed herein relates to a stator blade for a centrifugal compressor which can be used for defining return channels for example in multi-stage centrifugal compressors.

BACKGROUND ART

In centrifugal compressors, the rotor accelerates a gas flow in a circumferential direction around an axis in order to compress it centrifugally. Stator blades are usually placed downstream of one or more impellers of the rotor to straighten the gas flow following compression, in particular to correct the radial circumferential component of the velocity.

For example, in multi-stage compressors having one or more impellers, stator blades are placed in return channels between two consecutive impellers in order to receive a gas flow from the first rotor and direct it to the second rotor and straighten it in the process.

The shape of the stator blade interacts with the fluid differently depending on the flow conditions which depend on the operative condition of the compressor.

Typically, the stator blades design is optimized to cause a smooth flow around the blade at the design operational speed of the compressor. However, these blades may create losses when the compressor does not operate at its operational design speed, for example during start-up or shut-down or in operational conditions that require a continuous change of the compressor speed.

In these conditions, prior-art stator blades optimized for just one operative condition tend to cause local or even total flow separations, which cause stalls or recirculation areas and impact the performance of the compressor.

Therefore, it would be desirable to provide a stator blade which could operate over a wider range of operative conditions avoiding flow separations or at least reducing flow separations.

SUMMARY

According to one aspect, the subject-matter disclosed herein relates to a stator blade for a centrifugal compressor. The stator blade comprises a front portion arranged to receive a gas flow and having an external surface configured to guide the gas flow adjacent to the external surface, wherein the front portion is configured to generate at least one streamwise vortex in the gas flow.

According to another aspect, the subject-matter disclosed herein relates to a centrifugal compressor comprising at least one stator blade; such stator blade comprises a front portion arranged to receive a gas flow and having an external surface configured to guide the gas flow adjacent to the external surface, wherein the front portion is configured to generate at least one streamwise vortex in the gas flow.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 5 and FIG. 6 illustrate front schematic views of an operational configuration of respective embodiments of a stator blade disclosed herein;

FIG. 8, FIG. 9 and FIG. 10 illustrate front schematic views of respective embodiment of a stator blade disclosed herein;

FIG. 11, FIG. 12, FIG. 13, FIG. 14, FIG. 15, FIG. 16, FIG. 17 and FIG. 18 illustrate top schematic views of a particular of a stator blade according to different embodiments disclosed herein;

FIG. 19 and FIG. 20 illustrate section views of respective embodiments of a stator blade disclosed herein.

DETAILED DESCRIPTION OF EMBODIMENTS

Figure 1:
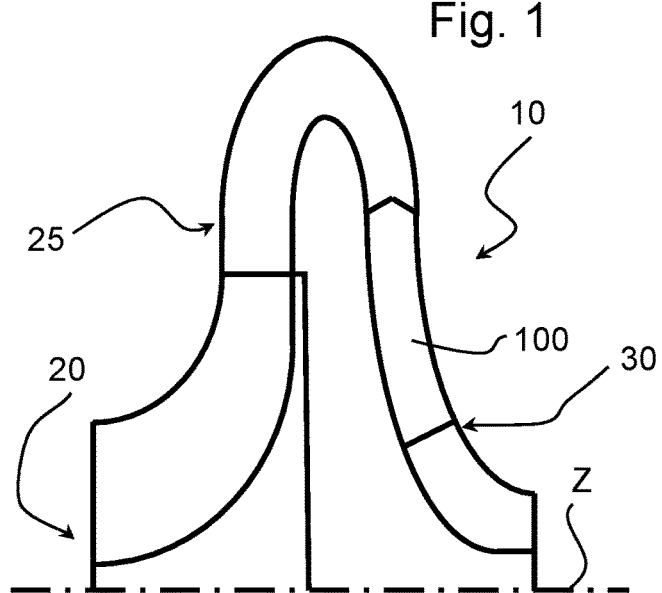
FIG. 1, FIG. 2 and FIG. 3 illustrate meridional schematic views of respective embodiments of a centrifugal compressor disclosed herein comprising respective embodiments of a stator blade disclosed herein.

The subject matter herein disclosed relates to a stator blade to be positioned in a compressor, downstream of an impeller of the rotor, in order to straighten the gas flow coming from the impeller. The stator blade has a front portion configured to generate one or more streamwise vortices in the gas flow which follow the stream of the flow and remain attached to an upper surface (also known as the "suction surface") of the stator blades.

A streamwise vortex is a vortex which extends parallel to the direction of the flow and defines a "vortex tube" in which the flow moves with a substantially helical trajectory. The streamwise vortices shuffle the boundary layer of the flow on the upper surface of the stator blade, re-energizing the boundary layer in order to prevent or delay the detachment of the flow from the surface, therefore delaying and/or reducing the entity of a stall of the stator blade. "Streamwise vorticity" and its generation are known as such from textbooks, for example from the book "Internal Flow — Concepts and Applications" of E. M. Greitzer, C. S. Tan and M. B. Graf published in 2004 and e-published in 2007 by Cambridge University Press.

More in detail, the vortices are generate by one or more pointed protrusions located in the front portion of the stator blade and are carried downstream by the gas flow along the upper surface of the blade.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

Figure 4:
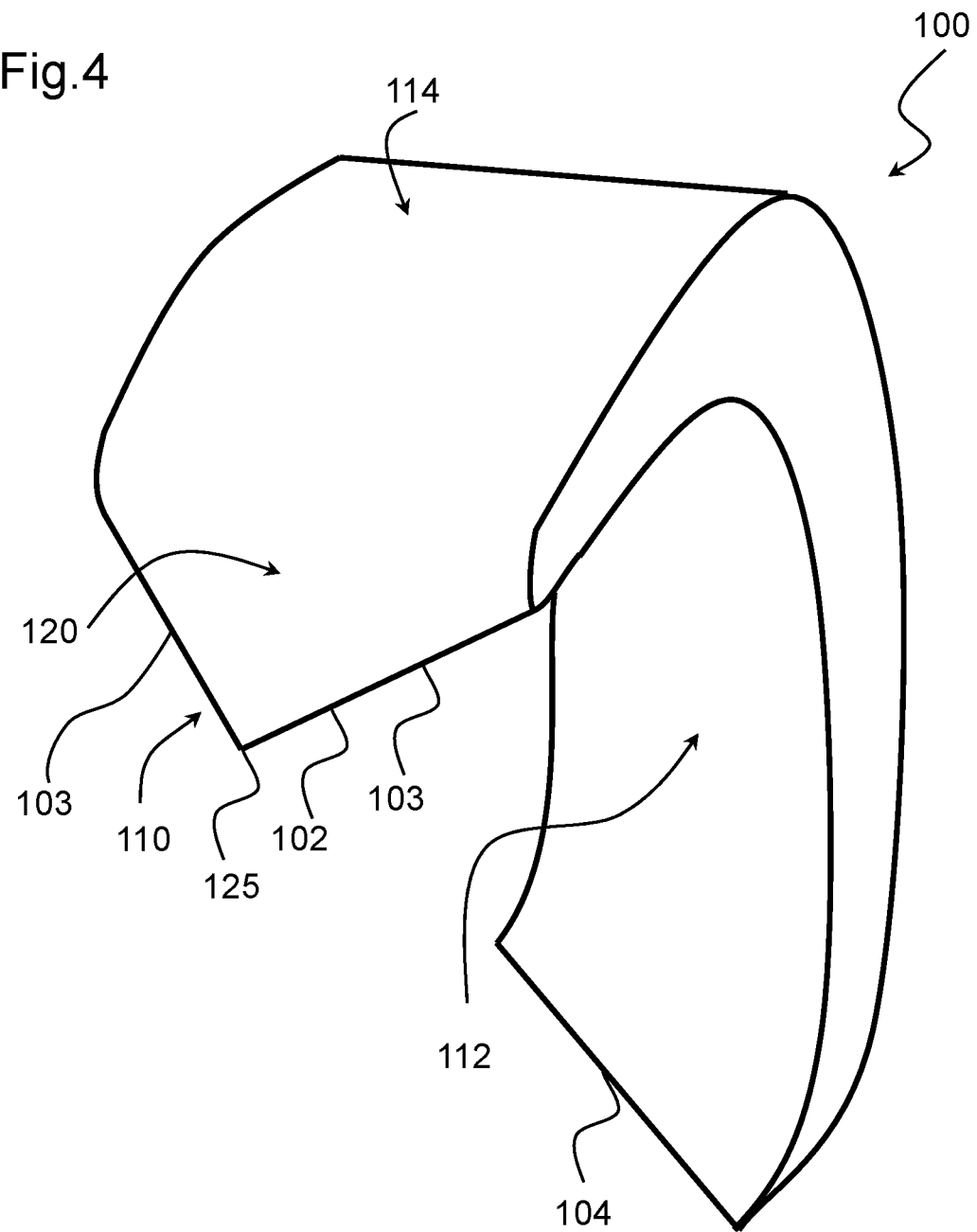
FIG. 4 illustrates a prospective view of an embodiment of a stator blade disclosed herein.

According to one aspect and with reference to FIG. 4, the subject-matter disclosed herein provides a stator blade 100 for a centrifugal compressor, in particular for a multi-stage centrifugal compressor to be used in a plant for processing gasses such as methane, ethane, propane, ethylene, carbon dioxide, helium, argon, hydrogen, refrigerant gasses or a mixture of these substances.

Figure 2:
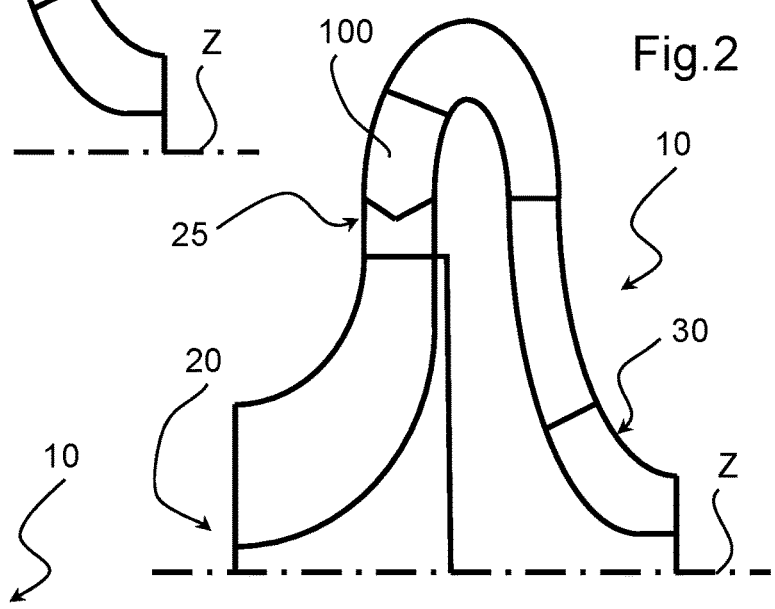
Figure 3:
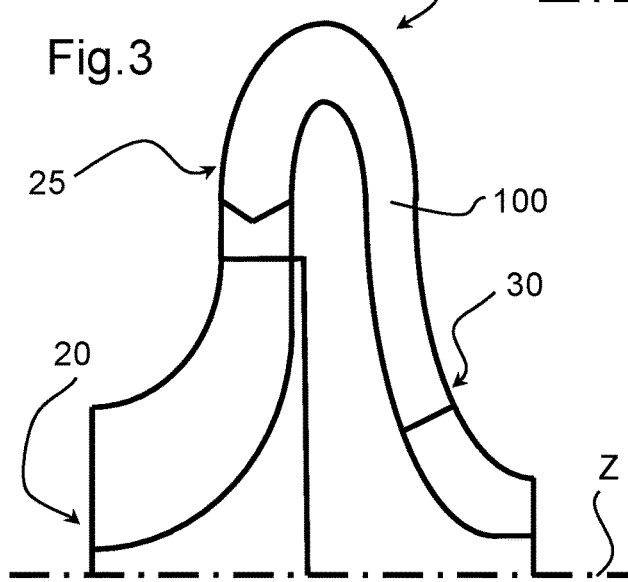

FIG. 1, FIG. 2 and FIG. 3 each shows a different embodiment of a stage 10 of a centrifugal compressor, each comprising a different embodiment of a stator blade 100 according to the subject-matter disclosed herein installed downstream of an impeller 20 of the compressor. The centrifugal compressor may be employed in a variety of different oil and gas applications, including: production, transportation, refinery, petrochemical and chemical industries, handling a very large variety of gases and mixtures of gases in a wide range of operating conditions (pressure and temperature).

More in detail, FIG. 1 shows an embodiment in which the stator blade 100 is installed in a return channel 30 of the compressor to act as a return channel blade of the compressor itself. FIG. 2 shows an embodiment in which the stator blade 100 is installed in a diffuser 25 to act as a diffuser blade of the compressor itself. FIG. 3 shows an embodiment in which the stator blade 100 extends at least partially through both the diffuser 25 and the return channel 30 of the compressor and through a 180° turn between the diffuser 25 and the return channel 30.

It is to be noted that, according to a variant of the embodiment of FIG. 2, there are blades according to the subject-matter disclosed herein both in the diffuser and in the return channel.

The gas flow coming from e.g. the impeller 20 has a velocity comprising a radial component and a circumferential component with respect to the longitudinal axis "Z" of the compressor stage 10. The stator blade 100 is either fixed to compressor stage 10 or configured to be arranged in the compressor stage 10, in the diffuser 25 and/or the return channel 30 in a predetermined position.

The position of the stator blade 100 in the compressor stage 10 is arranged and positioned in order for the stator blade 100 to be invested by the above-mentioned gas flow and to deviate it to lower or cancel its circumferential velocity component. The stator blade 100 is arranged and positioned in order to maintain the gas flow attached to its external surface, limiting or avoiding flow separations, from the leading edge 102 to the trailing edge 104 at least when the compressor is operated at its design operational speed.

More in detail, the stator blade 100 has a curved external surface configured to guide the gas flow from the leading edge 102 to the trailing edge 104 of the stator blade 100 itself. The external surface of the stator blade 100 comprises a pressure surface 112, that extends between the leading edge 102 and the trailing 104 on the "lower side" of the stator blade 100, and a suction surface 114 that extends between the leading edge 102 and the trailing 104 on the "upper side" of the stator blade 100. The pressure surface 112 identifies the portion of the external surface of the stator blade 100 which is subject to a pressure higher than the pressure of the surrounding the gas flow under normal operational conditions. The suction surface 114 identifies the portion of the external surface which is subject to a pressure lower than the pressure of the surrounding the gas flow under normal operational conditions. In general, the suction surface 114 is convex and the pressure surface 112 is concave or has a lower convexity than the suction surface 114.

The stator blade 100 comprises a front portion 110 arranged to receive a gas flow coming from e.g. the impeller 20 and to split it in a pressure-side gas flow adjacent to the pressure surface 112 and in a suction-side gas flow adjacent to the suction surface 114.

Figure 7:
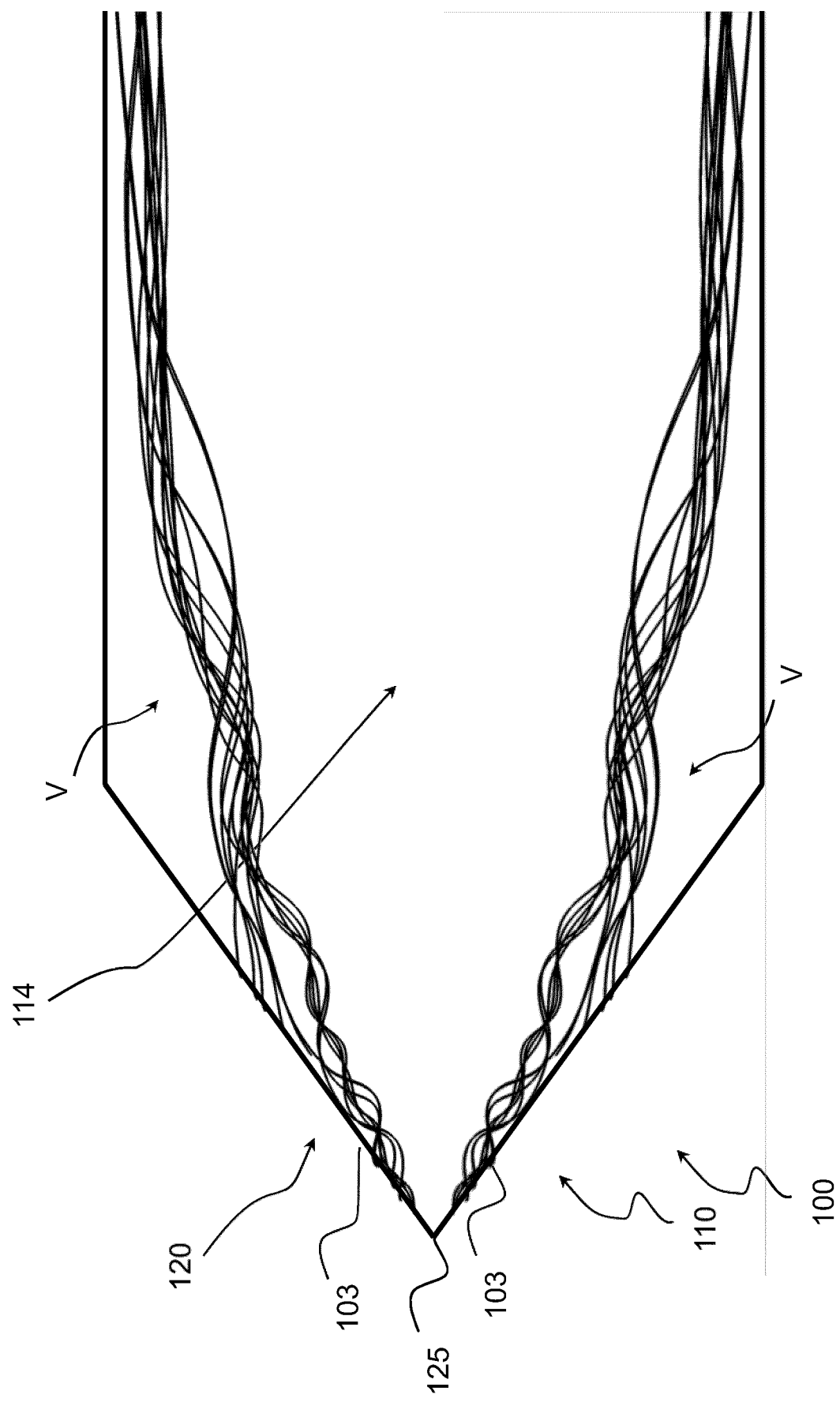
FIG. 7 illustrates a partial top view of an operational configuration of respective embodiments of a stator blade disclosed herein.

The front portion 110 is configured to generate at least one streamwise vortex "V" in the gas flow adjacent to the external surface of the stator blade 100. Preferably, the front portion 110 is configured to generate at least a couple of counter-rotating streamwise vortices "V", as shown in FIG. 5 and FIG. 7. In a possible embodiment shown in FIG. 6, the front portion 110 is configured to generate a plurality of couples of counter-rotating streamwise vortices "V".

Preferably, the front portion 110 is configured to generate the streamwise vortex "V" exclusively in the suction-side gas flow. In particular, the front portion 110 and the pressure surface 112 of the stator blade 100 are configured to maintain the pressure-side gas flow substantially free of streamwise vorticity.

Preferably, the streamwise vortices "V" have a diameter comprised between a minimum value and a maximum value, wherein the minimum value of the diameter is given by the formula 0.1b/N and the maximum value of the diameter is given by the formula 1.0b/N, wherein b is a median spanwise dimension of the stator blade 100 and N is the number of streamwise vortices "V".

In particular, the front portion 110 is configured to generate streamwise vortices "V" which have a diameter proportional to the median spanwise dimension of the stator blade 100 (and thus of the width of the channel in which the stator blade 100 is installed) and inversely proportional to the total number of streamwise vortices "V".

Preferably, the leading edge 102 of the stator blade 100 has at least one oblique stretch 103, configured to generate a streamwise vortex "V" of the above-mentioned type. In particular, the oblique stretch 103 defines an angle of attack with the incoming gas flow and causes the streamwise vortices "V" by lowering the pressure of the incoming gas flow. The oblique layout of the oblique stretch 103 determines an uneven distribution of pressure in the spanwise direction of the stator blade 100; this causes the establishment of a spanwise velocity component in the flow which leads to the formation of one of the streamwise vortices "V" shown in FIG. 7.

Figure 11:
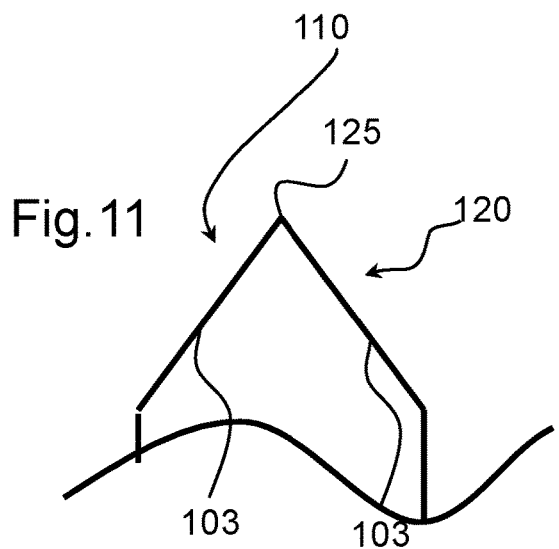
Figure 12:
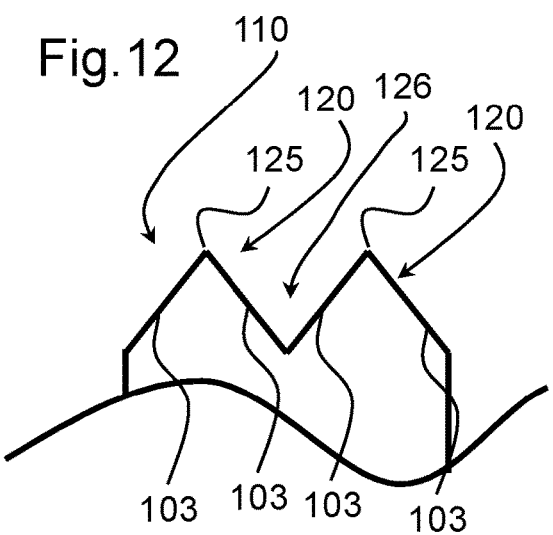
Figure 13:
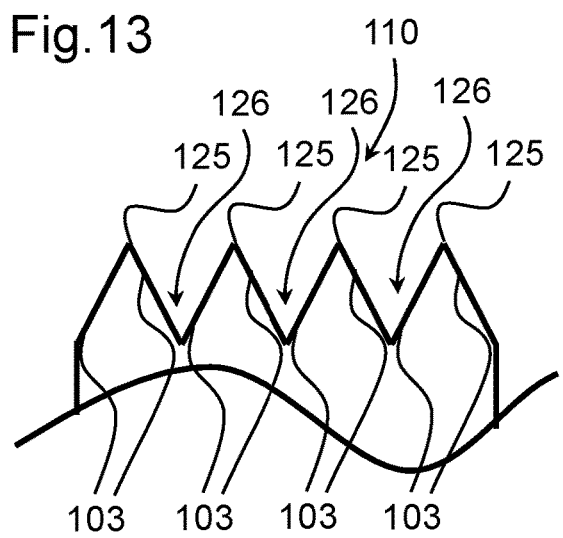
Figure 14:
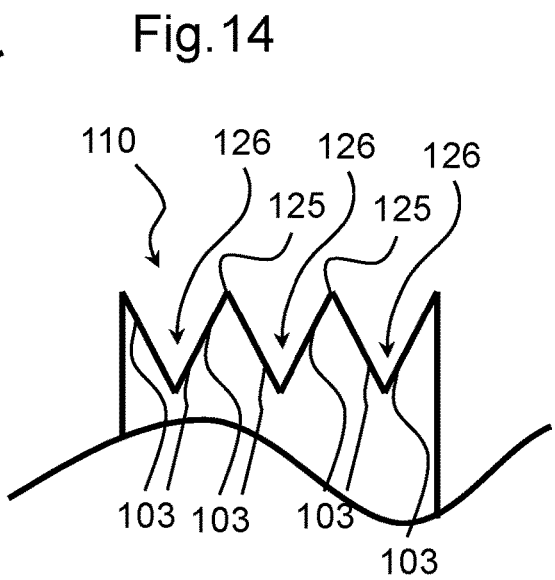

Preferably, the leading edge 102 has a plurality of oblique stretches 103. FIG. 4, FIG. 11 and FIG. 15 show embodiments of the stator blade 100 in which the leading edge 102 has two oblique stretches 103. FIG. 12 and FIG. 16 show embodiments of the stator blade 100 in which the leading edge 102 has four oblique stretches 103. FIG. 13 and FIG. 17 show embodiments of the stator blade 100 in which the leading edge 102 has eight oblique stretches 103. FIG. 14 and FIG. 18 show embodiments of the stator blade 100 in which the leading edge 102 has six oblique stretches 103. In a non-illustrated possible embodiment of the stator blade 100, the leading edge 102 has only one oblique stretch 103.

In particular, the oblique stretches 103 are oblique with respect to a spanwise direction of the stator blade 100 and can be either straight (as shown in FIG. 4, FIG. 11, FIG. 12, FIG. 13 and FIG. 14), or curved (as shown in FIG. 15, FIG. 16, FIG. 17 and FIG. 18). Advantageously, the oblique stretches 103 configured as described above are also oblique with respect to the direction of the gas flow investing the front portion 110.

In a preferred embodiment, the front portion 110 comprises at least one pointed protrusion 120 having a vertex 125. FIG. 4, FIG. 11 and FIG. 15 show embodiments of the stator blade 100 in which the front portion 110 comprises a single pointed protrusion 120. FIG. 12 and FIG. 16 show embodiments of the stator blade 100 in which the front portion 110 comprises two pointed protrusions 120. FIG. 13 and FIG. 17 show embodiments of the stator blade 100 in which the front portion 110 comprises four pointed protrusions 120.

Each pointed protrusion 120 defines at least two of the oblique stretches 103 of the leading edge 102 described above. In particular, the two oblique stretches 103 are positioned at opposite sides of the vertex 125 and are configured to generate two counter-rotating streamwise vortices "V".

In the embodiments of FIG. 4, FIG. 11, FIG. 12, FIG. 13 and FIG. 14, the pointed protrusions 120 have a triangular shape in a median plane of the stator blade 100 and defines the straight oblique stretches 103. In the embodiments of FIG. 15, FIG. 16, FIG. 17 and FIG. 18, the pointed protrusions 120 have a cusp shape in a median plane of the stator blade 100 and define the curved oblique stretches 103.

Preferably, the pointed protrusions 120 project in a forward direction which defines an angle between 20° and −20° with respect to a line tangent at a front end of a stretch of the mean camber line of the stator blade 100 located at the front portion 110; this stretch starts from the leading edge of the blade (excluding the pointed protrusion) and may amount for example to 10-20% of the total length of the mean camber line. In a preferred embodiment illustrated in FIG. 4, the forward direction in which the pointed protrusion 120 project is substantially tangent to the above-mentioned stretch of the mean camber line located at the front portion 110.

In a possible non-illustrated embodiment, the stator blade 100 comprises a plurality of pointed protrusions 120 projecting in different forward directions; a forward direction defines an angle between 20° and −20° with respect to a line tangent at a front end of a stretch of said mean camber line; this stretch is located at the front portion 110 of the stator blade 100 and starts from the leading edge of the stator blade 100 (excluding the pointed protrusion).

Preferably, each pointed protrusion 120 is symmetrical with respect to a longitudinal plane of the stator blade 100. According to a possible alternative non-illustrated embodiment of the stator blade 100 comprises one or more asymmetrical pointed protrusions 120 in which the oblique stretches 103 relative to the pointed protrusion 120 define different angles with respect to the spanwise direction of the stator blade 100.

Preferably, the pointed protrusions 120 have a longitudinal extension along the forward direction comprised between a minimum value and a maximum value. The minimum value is given by the formula 0.2b/M and the maximum value of the extension is given by the formula 2.0b/M, wherein b is the median spanwise dimension of the stator blade 100 and M is the number of pointed protrusions 120 in the front portion 110.

Preferably, the leading edge 102 has a vertex angle of less than 60° at the vertex 125 of the pointed protrusions 120, more preferably less than 50°. The vertex angle is to be intended as the angle between the two oblique stretches 103 adjacent to the same vertex 125. More in detail, the vertex angle should be measured in a camber plain of the stator blade 100.

Preferably, the stator blade 100 has a spanwise variable airfoil, wherein the airfoil changes gradually between a vertex airfoil located at the pointed protrusion 120 and a trough airfoil located next to (at some distance from) the pointed protrusion 120 or in a trough 126 between two pointed protrusions 120. More in detail, the vertex airfoil has a sharp leading edge 102a and the trough airfoil has either a sharp or a rounded leading edge.

FIG. 19 shows a sharp leading edge airfoil which can be employed as the vertex airfoil. In this figure, the pointed protrusion 120 projects in a forward direction D; in general, the forward direction defines an angle between 20° and −20° with respect to a line tangent at a front end of a stretch 128 of the mean camber line; stretch 128 is located at front portion 110 of stator blade 100 and starts (see point 129) from the leading edge of stator blade 100 (excluding the pointed protrusion); in the embodiment of FIG. 19, forward direction D coincides with the tangent line, i.e. the angle is 0°.

FIG. 20 shows a round leading edge airfoil which can be employed as the trough airfoil.

FIG. 8 shows an embodiment of the stator blade 100 having a sharp leading edge 102a extending along the whole spanwise dimension. FIG. 9 shows an embodiment of the stator blade 100 having a sharp leading edge 120a at the vertex 125 extending spanwise for a portion of the spanwise dimension and then changing to a rounded leading 120 on the sides of the stator blade 100. FIG. 10 shows an embodiment of the stator blade 100 having a sharp leading edge 102a only at the vertex 125 of the pointed protrusion 120, immediately changing to a round leading edge 102b at the sides of the vertex 125.

According to another aspect and with reference to FIG. 1, FIG. 2, FIG. 3 and FIG. 21, the subject-matter disclosed herein provides a centrifugal compressor 2100, preferably of multi-stage type, which comprises a plurality of stator blades 100 of the type described above. In particular, the centrifugal compressor comprises a plurality of compressor stages 10, each having an impeller 20, a diffuser 25 and a return channel 30, and each compressor stage 10 comprises a plurality of stator blades 100 arranged in a circular array in the diffuser 25 and/or in the return channel 30. More in detail, the circular arrays of stator blades 100 extends around the longitudinal axis "Z" in order to receive an incoming flow from the impeller 20 of the compressor stage 10 having a circumferential component of the velocity around the longitudinal axis "Z" and to change the direction of the flow in order to lower or cancel the circumferential component of the velocity and to deliver a clean, straight flow to the rotor of the following compressor stage.

Figure 21:
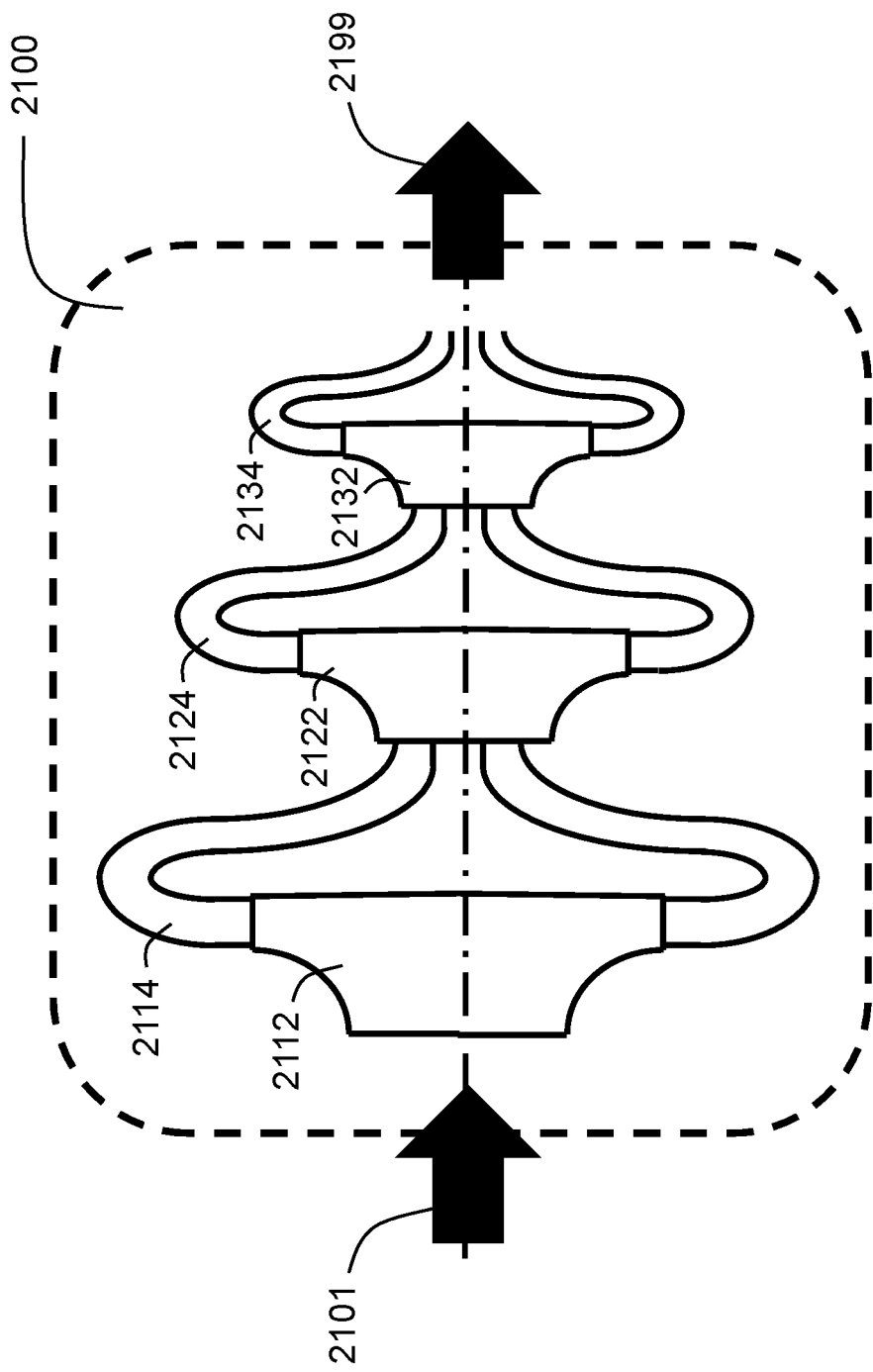
FIG. 21 illustrates schematically an embodiment of a compressor.

According to the embodiment of FIG. 21, the centrifugal compressor 2100 has an inlet 2101 for receiving a (e.g. non-compressed) working fluid and an outlet 2199 for ejecting the working fluid after compression. Compressor 2100 comprises for example three compression stages fluidly coupled; a first (or initial) compression stage includes an impeller 2112 and downstream thereof an annular conduit 2114 leading to the next stage; a second (or intermediate) compression stage includes an impeller 2122 and downstream thereof an annular conduit 2124 leading to the next stage; a third (or final) compression stage includes an impeller 2132 and downstream thereof an annular conduit 2134 leading to the next stage. As already explained, one or more stator blades configured to generate at least one streamwise vortex in the working fluid flow are located in one or more or all of the annular conduits 2114 and 2124 and 2134.

The invention claimed is:

1. A stator blade for a centrifugal compressor, comprising:
a front portion arranged to receive a gas flow, the front portion having an external surface configured to guide the gas flow adjacent to the external surface,
wherein the front portion has a leading edge that is configured to generate at least one streamwise vortex in the gas flow, and
wherein the leading edge has a pair of adjacent protrusions each terminating at a vertex that has a cusp shape formed by a pair of oblique stretches that are curved, and
wherein adjacent oblique stretches of the pair of adjacent protrusions that together form a curved trough therebetween.

2. The stator blade of claim 1, wherein the leading edge generates at a pair of counter-rotating streamwise vortices in said gas flow on the oblique stretch.

3. The stator blade of claim 1, wherein the pair of adjacent protrusions project in a forward direction.

4. The stator blade of claim 1, wherein the protrusions are symmetrical.

5. The stator blade of claim 1, wherein the protrusions have a spanwi se variable airfoil.

6. The stator blade of claim 1 arranged to be used as a return channel blade of a multi-stage centrifugal compressor.

7. The stator blade of claim 1 arranged to be used as a diffuser blade of a centrifugal compressor.

8. A centrifugal compressor for gas processing plants comprising the stator blade according to claim 1.

9. The centrifugal compressor of claim 8, wherein the compressor is multi-stage and has a plurality of compressor stages, at least one compressor stage having a rotor, a diffuser, and a return channel.

10. The stator blade of claim 1, wherein the protrusions have a mean camber line, wherein the adjacent protrusions point in a forward direction that defines an angle between 20° and −20° with respect to a line tangent at a front end of a stretch of the mean camber line.

11. The stator blade of claim 1, wherein the protrusions have a spanwise variable airfoil that varies between at least a vertex airfoil and at least a trough airfoil.

12. The stator blade of claim 1, wherein the protrusions have a spanwise variable airfoil located at the pair of protrusions and having a sharp leading edge defining said vertex of the pointed protrusion.

* * * * *